United States Patent
Nakano et al.

(10) Patent No.: US 11,768,102 B2
(45) Date of Patent: Sep. 26, 2023

(54) VIBRATION MEASUREMENT SYSTEM, VIBRATION MEASUREMENT APPARATUS, VIBRATION MEASUREMENT METHOD, AND COMPUTER-READABLE RECORDING MEDIUM

(71) Applicant: NEC Corporation, Tokyo (JP)

(72) Inventors: Gaku Nakano, Tokyo (JP); Masahiko Ohta, Tokyo (JP); Asuka Ishii, Tokyo (JP); Kazuhito Murata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 542 days.

(21) Appl. No.: 17/042,556

(22) PCT Filed: Mar. 29, 2018

(86) PCT No.: PCT/JP2018/013506
§ 371 (c)(1),
(2) Date: Sep. 28, 2020

(87) PCT Pub. No.: WO2019/186984
PCT Pub. Date: Oct. 3, 2019

(65) Prior Publication Data
US 2021/0033451 A1 Feb. 4, 2021

(51) Int. Cl.
*G01H 9/00* (2006.01)
*G06T 7/73* (2017.01)
*G01B 11/26* (2006.01)

(52) U.S. Cl.
CPC .............. *G01H 9/00* (2013.01); *G01B 11/26* (2013.01); *G06T 7/73* (2017.01)

(58) Field of Classification Search
CPC ....... G06T 3/00; G06T 3/0006; G06T 3/0093; G06T 5/006; G06T 7/0002; G06T 7/0004;
(Continued)

(56) References Cited

U.S. PATENT DOCUMENTS 11,178,333 B2 * 11/2021 Nakano et al. ...... G01C 19/065
2015/0146215 A1 * 5/2015 Kobayashi et al. ..........
G01B 11/2504
356/610

(Continued)

FOREIGN PATENT DOCUMENTS

EP   3 425 325 B1 *  9/2022 ............. G01B 11/16
JP   H10-82614 A    3/1998
(Continued)

OTHER PUBLICATIONS

Machine translation of JP 2007-278951 A, published Oct. 25, 2008 (Year: 2007).*

(Continued)

*Primary Examiner* — Andrew W Johns
(74) *Attorney, Agent, or Firm* — Sughrue Mion, PLLC (57) ABSTRACT

A vibration measurement apparatus 30 includes a detection unit 31 that acquires, as a pattern image from an image capturing apparatus 20 that shoots a measurement target surface of a structure 40, an image of the measurement target surface onto which pattern light is projected by an optical apparatus 10, and detects the pattern light from the pattern image, an estimation unit 32 that estimates an angle between the normal of the image capturing surface and the normal of the measurement target surface, based on the pattern light, an image conversion unit 33 that converts the shot image into an image that would be obtained were the normal of the measurement target surface coincident with the normal of the image capturing surface of the image capturing apparatus 20, using the estimated angle, and a vibration measurement unit 34 that measures the vibration of the structure 40 using the converted image.

12 Claims, 7 Drawing Sheets

(58) Field of Classification Search
CPC .. G06T 7/20; G06T 7/246; G06T 7/30; G06T 7/33; G06T 7/70; G06T 7/73; G06V 10/24; G06V 10/243; G06V 10/247; G01B 11/167; G01B 11/26; G01B 11/27; G01B 11/272; G01H 9/00
See application file for complete search history.

(56) References Cited

U.S. PATENT DOCUMENTS

2018/0372536 A1* 12/2018 Carmon .................. B60N 2/002
2020/0370947 A1* 11/2020 Husar ...................... G01H 9/00

FOREIGN PATENT DOCUMENTS

| JP | 2003-156389 A | 5/2003 |
|----|---------------|--------|
| JP | 2005-283440 A | 10/2005 |
| JP | 2007-278951 A | 10/2007 |
| JP | 2015-087135 A | 5/2015 |
| JP | 2017-075887 A | 4/2017 |
| JP | 2017-142185 A | 8/2017 |

OTHER PUBLICATIONS

International Search Report for PCT Application No. PCT/JP2018/013506, dated Jun. 12, 2018.
English translation of Written opinion for PCT Application No. PCT/JP2018/013506, dated Jun. 12, 2018.
Hironobu Horiuchi. "Displacement Measurement System Using Moire". 2010 Meeting of the Japan Society of Civil Engineers, pp. 67-72 (corresponds to Document 6, pp. 1-6, in Written Opinion dated Jun. 12, 2018).

* cited by examiner

VIBRATION MEASUREMENT SYSTEM, VIBRATION MEASUREMENT APPARATUS, VIBRATION MEASUREMENT METHOD, AND COMPUTER-READABLE RECORDING MEDIUM

This application is a National Stage Entry of PCT/JP2018/013506 filed on Mar. 29, 2018, the contents of all of which are incorporated herein by reference, in their entirety.

TECHNICAL FIELD

The present invention relates to a vibration measurement system, a vibration measurement apparatus and a vibration measurement method that are for measuring vibration of structures such as infrastructure elements using image processing, and further relates to a computer-readable recording medium that includes a program recorded thereon for realizing the system, apparatus and method.

BACKGROUND ART

Heretofore, technologies for contactlessly measuring mechanical vibration of an object from a remote location have been proposed. According to such technologies, attachment and removal of sensors for vibration detection is no longer necessary and efficient vibration measurement becomes possible, and thus there is demand particularly in fields such as maintenance management and anomaly detection of infrastructure elements such as bridges, roads, buildings and facilities.

For example, Patent Document 1 discloses a vibration measurement apparatus that uses an image capturing apparatus. The vibration measurement apparatus disclosed in Patent Document 1 acquires time-series images of an object from the image capturing apparatus, and performs image processing on the acquired time-series images to measure vibration of the object.

Patent Document 2 discloses a vibration measurement apparatus that is also provided with a distance measurement apparatus such as a laser range finder or an ultrasonic range finder, in addition to an image capturing apparatus. According to the vibration measurement apparatus disclosed in Patent Document 2, the vibration component in the optical axis direction of the image capturing apparatus can also be measured by the distance measurement apparatus, in addition to the vibration component in two-dimensional directions within an image, thus enabling vibration of an object to be measured in three-dimensional directions.

Incidentally, in order to enhance the accuracy of vibration measurement with the vibration measurement apparatus disclosed in Patent Documents 1 and 2, the image capturing apparatus and the image capturing target surface need to be arranged directly facing each other, with the image capturing surface of the image capturing apparatus parallel to the image capturing target surface. However, given that the image capturing apparatus is usually installed manually, and that, furthermore, the place where the infrastructure element to be measured is installed is not necessarily flat, it is very difficult for an operator to accurately arrange the image capturing surface of the image capturing apparatus and the image capturing target surface directly facing each other.

In response to this, Patent Document 3, for example, proposes a technique for accurately measuring the vibration of an object, without arranging the image capturing apparatus and the measurement target surface directly facing each other. Specifically, with the technique disclosed in Patent Document 3, a plurality of markers provided with a repetitive pattern that changes in the vertical direction are attached in advance to a lateral surface or the like of the infrastructure element to be measured. Subsequently, the amount of change in the repetitive pattern of each marker is calculated from shot moving image data, and, furthermore, a correction amount for vibration of the object is calculated from the calculated amount of change of each marker. According to the technique disclosed in Patent Document 3, it is conceivable for the accuracy of vibration measurement to be enhanced, even in the case where the image capturing surface of the image capturing apparatus and the image capturing target surface are not parallel.

LIST OF RELATED ART DOCUMENTS

Patent Document

Patent Document 1: Japanese Patent Laid-Open Publication No. 2003-156389
Patent Document 2: Japanese Patent Laid-Open Publication No. 2005-283440
Patent Document 3: Japanese Patent Laid-Open Publication No. 2017-142185

SUMMARY OF INVENTION

Problems to be Solved by the Invention

However, in order to implement the technique disclosed in Patent Document 3, a plurality of markers need to be attached to the infrastructure element serving as the object. Given that the markers need to be attached manually, and that, furthermore, there are risks involved in installation, considerable human costs, time costs and monetary costs will be incurred in implementing the technique disclosed in Patent Document 3.

An example object of the invention is to provide a vibration measurement system, a vibration measurement apparatus, a vibration measurement method and a computer-readable recording medium that solve the above problems and can execute highly accurate vibration measurement without requiring manual operations.

Means for Solving the Problems

A vibration measurement system according to an example aspect of the invention is a system for measuring vibration of a structure, including:

an optical apparatus that projects pattern light onto a measurement target surface of the structure;
an image capturing apparatus that shoots the measurement target surface; and
a vibration measurement apparatus,
the vibration measurement apparatus including:
a detection unit that acquires, as a pattern image from the image capturing apparatus, an image of the measurement target surface onto which the pattern light is projected, and detects the projected pattern light from the pattern image;
an estimation unit that estimates an angle between a normal of an image capturing surface of the image capturing apparatus and a normal of the measurement target surface, based on the detected pattern light;
an image conversion unit that converts the image obtained due to shooting by the image capturing apparatus into an image that would be obtained were the normal of the measurement target surface coincident with the normal of the image capturing surface of the image capturing apparatus, using the estimated angle; and a vibration measurement unit that measures vibration of the structure, using the converted image.

Also, a vibration measurement apparatus according to an example aspect of the invention is an apparatus for measuring vibration of a structure, including:

a detection unit that acquires, as a pattern image from an image capturing apparatus that shoots a measurement target surface of the structure, an image of the measurement target surface onto which pattern light is projected by an optical apparatus, and detects the projected pattern light from the pattern image;

an estimation unit that estimates an angle between a normal of an image capturing surface of the image capturing apparatus and a normal of the measurement target surface, based on the detected pattern light;

an image conversion unit that converts the image obtained due to shooting by the image capturing apparatus into an image that would be obtained were the normal of the measurement target surface coincident with the normal of the image capturing surface of the image capturing apparatus, using the estimated angle; and a vibration measurement unit that measures vibration of the structure, using the converted image.

Also, a vibration measurement method according to an example aspect of the invention is a method for measuring vibration of a structure, including:

(a) a step of projecting pattern light onto a measurement target surface of the structure with an optical apparatus;

(b) a step of shooting the measurement target surface with an image capturing apparatus;

(c) a step of acquiring, as a pattern image from the image capturing apparatus, an image of the measurement target surface onto which the pattern light is projected, and detecting the projected pattern light from the pattern image;

(d) a step of estimating an angle between a normal of an image capturing surface of the image capturing apparatus and a normal of the measurement target surface, based on the detected pattern light;

(e) a step of converting the image obtained due to shooting by the image capturing apparatus into an image that would be obtained were the normal of the measurement target surface coincident with the normal of the image capturing surface of the image capturing apparatus, using the estimated angle; and (f) a step of measuring vibration of the structure, using the converted image.

Furthermore, a computer-readable recording medium according to an example aspect of the invention includes a program recorded thereon for measuring vibration of a structure with a computer, the program including instructions that cause the computer to carry out:

(a) a step of acquiring, as a pattern image from an image capturing apparatus that shoots a measurement target surface of the structure, an image of the measurement target surface onto which pattern light is projected by an optical apparatus, and detecting the projected pattern light from the pattern image;

(b) a step of estimating an angle between a normal of an image capturing surface of the image capturing apparatus and a normal of the measurement target surface, based on the detected pattern light;

(c) a step of converting the image obtained due to shooting by the image capturing apparatus into an image that would be obtained were the normal of the measurement target surface coincident with the normal of the image capturing surface of the image capturing apparatus, using the estimated angle; and (d) a step of measuring vibration of the structure, using the converted image.

Advantageous Effects of the Invention

As described above, according to the invention, highly accurate vibration measurement can be executed without requiring manual operations.

EXAMPLE EMBODIMENTS

Example Embodiment

Hereinafter, a vibration measurement system, a vibration measurement apparatus, a vibration measurement method and a program in an example embodiment of the invention will be described with reference to FIGS. 1 to 7.

[System configuration]

Figure 1:
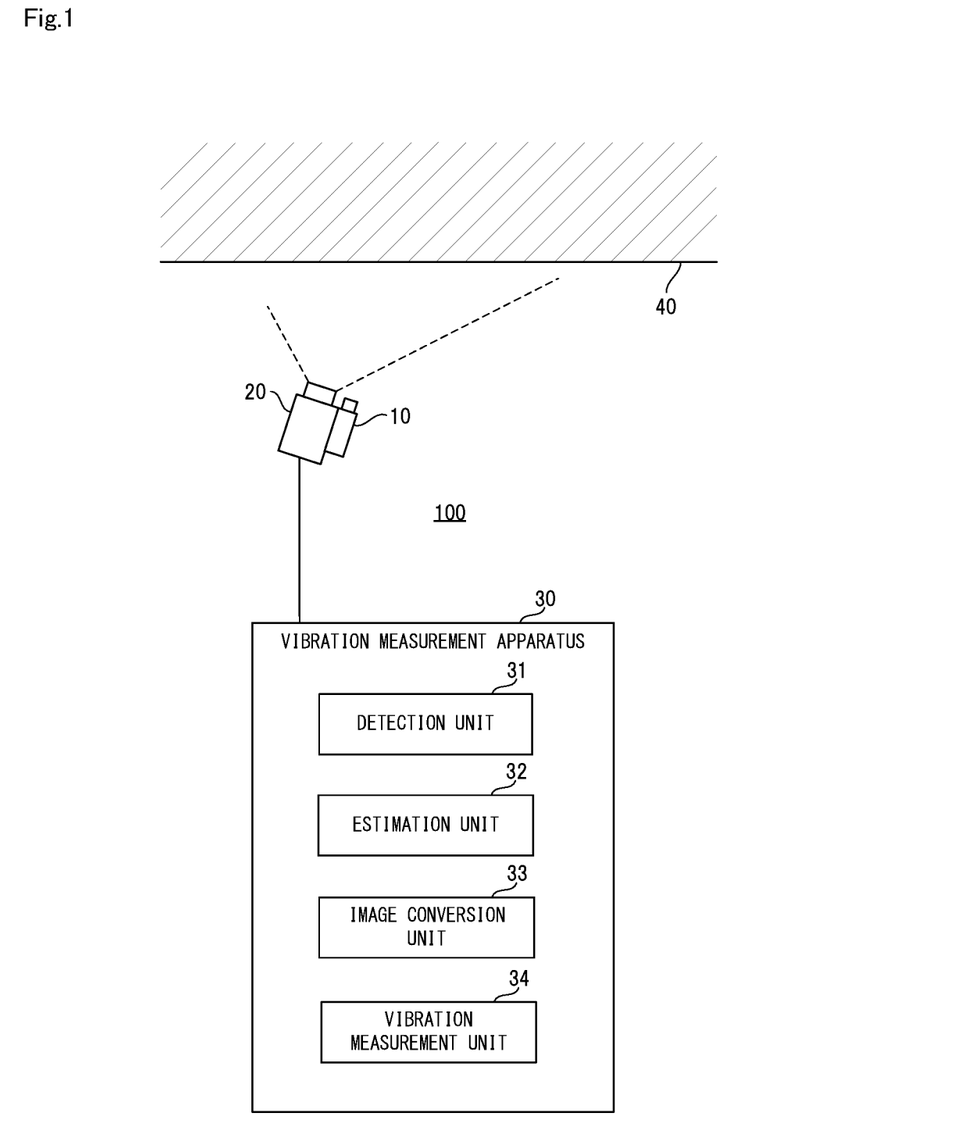
FIG. 1 is a block diagram showing schematic configurations of a vibration measurement system and a vibration measurement apparatus in an example embodiment of the invention.

Initially, schematic configurations of the vibration measurement system and the vibration measurement apparatus in the example embodiment will be described using FIG. 1. FIG. 1 is a block diagram showing schematic configurations of the vibration measurement system and the vibration measurement apparatus in the example embodiment of the invention.

A vibration measurement system 100 in the example embodiment shown in FIG. 1 is a system for measuring vibration of a structure 40. In the example embodiment, infrastructure elements such as bridges, roads, buildings and facilities, for example, are given as the structure 40.

As shown in FIG. 1, the vibration measurement system 100 is provided with an optical apparatus 10, an image capturing apparatus 20, and a vibration measurement apparatus 30. The optical apparatus 10 is an apparatus that projects pattern light onto a measurement target surface of the structure 40. The image capturing apparatus 20 is an apparatus for shooting the measurement target surface. The vibration measurement apparatus 30 is an apparatus for measuring vibration of the structure 40.

Also, as shown in FIG. 1, the vibration measurement apparatus 30 is provided with a detection unit 31, an estimation unit 32, an image conversion unit 33, and a vibration measurement unit 34.

The detection unit 31 acquires, as a pattern image from the image capturing apparatus 20, an image of the measurement target surface onto which the pattern light was projected, and detects the projected pattern light from this pattern image. The estimation unit 32 estimates an angle between the normal of the image capturing surface of the image capturing apparatus 20 and the normal of the measurement target surface, based on the detected pattern light.

The image conversion unit 33 converts the image obtained due to shooting by the image capturing apparatus 20 into an image that would be obtained were the normal of the measurement target surface coincident with the normal of the image capturing surface of the image capturing apparatus 20, using the estimated angle. The vibration measurement unit 34 measures the vibration of the structure, using the converted image.

In this manner, in the example embodiment, the angle between the image capturing surface of the image capturing apparatus 20 and the measurement target surface is estimated, and the image of the measurement target surface is converted using this angle. Therefore, in the example embodiment, the image capturing apparatus 20 is able to execute highly accurate vibration measurement without requiring manual operations, even in the case of not directly facing the measurement target surface.

Figure 2:
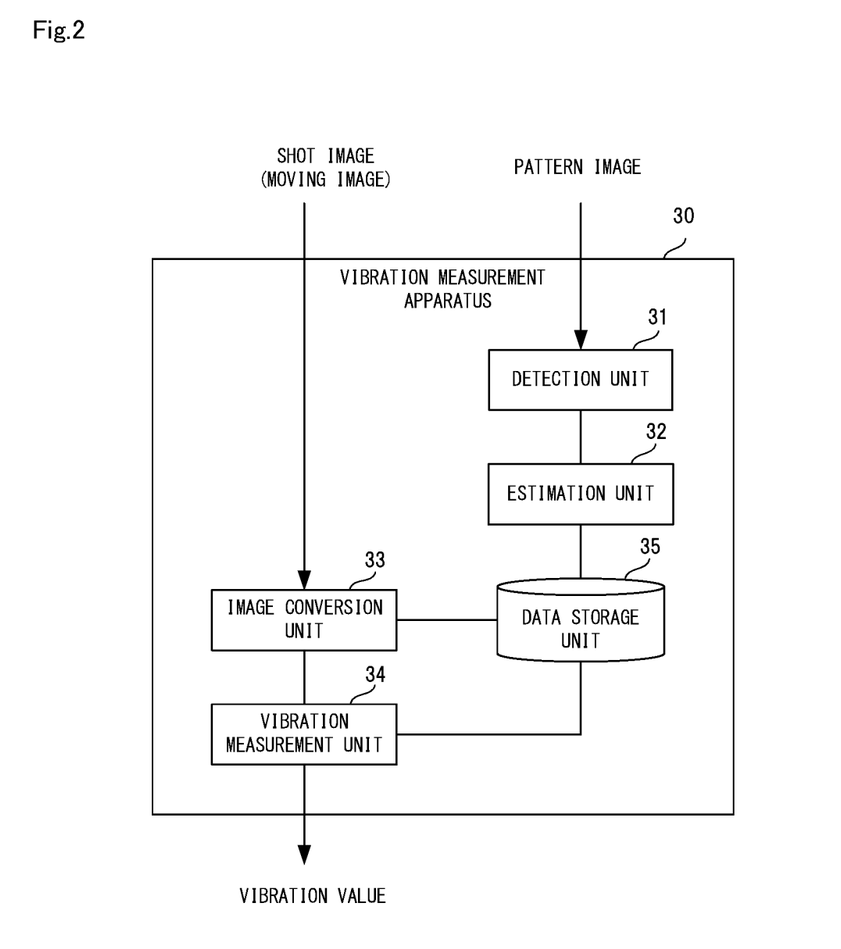
FIG. 2 is a block diagram more specifically showing the configuration of the vibration measurement apparatus in the example embodiment of the invention.
Figure 3:
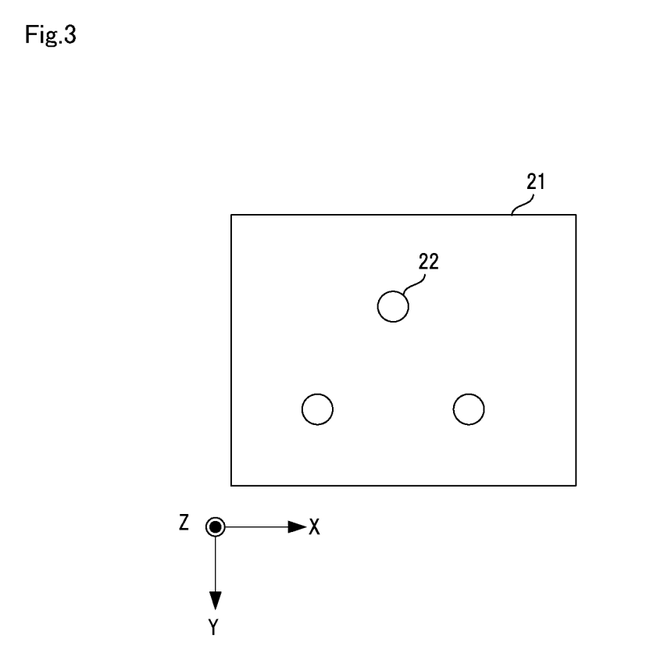
FIG. 3 is a diagram showing an example of a pattern image that is used in the example embodiment of the invention.
Figure 4:
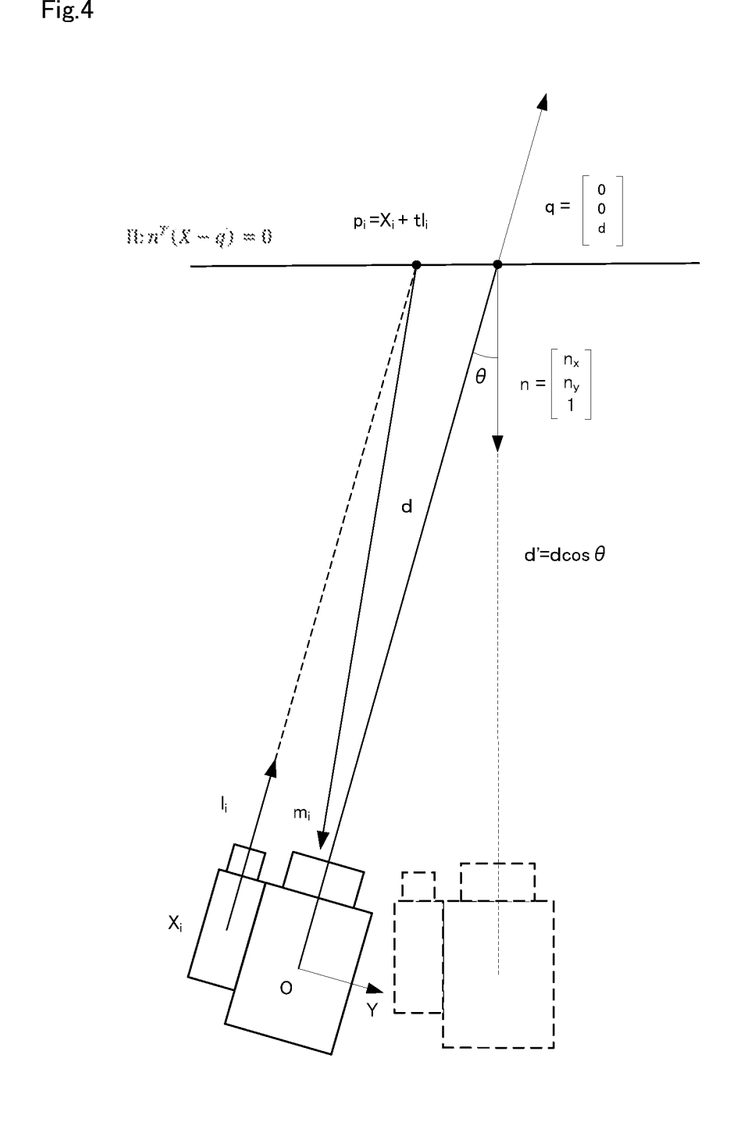
FIG. 4 is an illustrative diagram illustrating angle estimation processing that is performed in the example embodiment of the invention.

Next, the configurations of the vibration measurement system 100 and the vibration measurement apparatus 30 in the example embodiment will be described more specifically using FIGS. 2, 3 and 4 in addition to FIG. 1. FIG. 2 is a block diagram more specifically showing the configuration of the vibration measurement apparatus in the example embodiment of the invention. FIG. 3 is a diagram showing an example of a pattern image that is used in the example embodiment of the invention. FIG. 4 is an illustrative diagram illustrating angle estimation processing that is performed in the example embodiment of the invention.

First, in the example embodiment, assuming that the structure 40 is a bridge, for example, the measurement target surface is set to a region (deck slab) of the lower surface of the bridge. In this case, the optical apparatus 10 and the image capturing apparatus 20 are installed facing toward the region of the lower surface of the bridge.

In the example embodiment, a laser irradiation apparatus is used as the optical apparatus 10. Also, the optical apparatus 10, which is a laser irradiation apparatus, projects the focused spot of a plurality of laser beams onto the measurement target surface as pattern light.

In the example embodiment, a digital camera is used as the image capturing apparatus 20. The image capturing apparatus 20 continuously outputs image data of the measurement target surface at a set interval. The image data output by the image capturing apparatus 20 is input to the vibration measurement apparatus 30.

Also, as shown in FIG. 2, in the example embodiment, the vibration measurement apparatus 30 is provided with a data storage unit 35, in addition to the abovementioned detection unit 31, estimation unit 32, image conversion unit 33 and vibration measurement unit 34. The data storage unit 35 stores the angle and distance, which will be described later, estimated by the estimation unit 32.

The detection unit 31, upon the image capturing apparatus 20 shooting an image of the measurement target surface onto which the pattern light is projected, acquires the image (pattern image 21) obtained by the shooting. As shown in FIG. 3, in the example embodiment, there are a plurality of focused spots 22 in the pattern image 21.

Furthermore, the detection unit 31 detects the focused spots 22 from the pattern image 21, based on a feature value of the focused spots 22 set in advance, and specifies the position coordinates (X, Y) of each focused spot 22 that is detected. Also, in FIG. 3, the X-axis indicates the horizontal direction of the image capturing surface, the Y-axis indicates the vertical direction of the image capturing surface, and the Z-axis indicates the normal direction of the image capturing surface.

The estimation unit 32, in the example embodiment, estimates an angle $\theta$ between the normal of the image capturing surface of the image capturing apparatus 20 and the normal of the measurement target surface, and, furthermore, estimates a distance d from the image capturing surface of the image capturing apparatus 20 to the measurement target surface, based on the focused spots 22 that are detected. Also, the estimated angle $\theta$ and distance d are stored in the data storage unit 35.

Specifically, the estimation unit 32 sets, for every focused spot 22, an equation indicating the relationship between the position coordinates of the focused spot, the center position coordinates of the laser beams, and the normal of the measurement target surface. The estimation unit 32 then estimates the distance d and the angle $\theta$, using the equations respectively set for the focused spots. Here, processing for estimating the angle $\theta$ and the distance d will be described in more detail using FIG. 4.

As shown in FIG. 4, first, an origin O of three-dimensional coordinates is set as the center of the image capturing apparatus 20. Also, in FIG. 4, "i" indicates an identification number of the laser beam that is irradiated by the optical apparatus 10. The laser beams that form the focused spots 22 are irradiated from a laser center $X_i$, advance in a direction $l_i$, and intersect an observation plane $\pi$ at a point (intersection point) $p_i$.

The observation plane $\pi$ corresponds to the measurement target surface, and is located at the distance d from the image capturing apparatus 20. Also, a normal n of the observation plane $\pi$ inclines at the angle $\theta$ to the normal (camera optical axis) of the image capturing surface of the image capturing apparatus 20. Also, intersection point $p_i$ is projected as a point $m_i$ on the image.

Because the laser center $X_i$, the direction $l_i$ and $m_i$ are set in advance, the estimation unit 32 estimates t and $p_i$, d, n and $\theta$ that are shown in FIG. 4.

Here, the intersection point $p_i$ can be indicated by the following equation 1. Because the intersection point $p_i$ is also a point on the observation plane $\pi$, $n^T(p_i-q)=0$ is satisfied. Therefore, equation 2 is derived when $p_i$ is removed from the above equation and equation 1, and, furthermore, the following equation 3 is derived when t is removed from equation 1.

$$p_i = X_i + t l_i \quad \text{[Equation 1]}$$

$$t = \frac{n^T(q - X_i)}{n^T l_i} \quad \text{[Equation 2]}$$

-continued (where $T$ represents transposition)

$$p_i = X_i + \frac{n^T(q - X_i)}{n^T l_i} l_i \quad \text{[Equation 3]}$$

Since the intersection point $p_i$ is a function represented by n and d according to the above equation 3, n and d need to be derived. Here, n and d that minimize the following equation 4 need only be derived, where K is a 3×3 matrix of camera parameters within the image capturing apparatus 20, and N is the number of laser beams that form the focused spots 22.

$$\min_{n,d} \sum_{i=1}^{N} \|m_i - K p_i\|^2 \quad \text{[Equation 4]}$$

Specifically, there are three unknowns, namely, the components $n_x$ and $n_y$ of the normal n and the distance d, and two constraints arise from the set $\{m_i, p_i\}$. Accordingly, initial values can be estimated through linearization if there are a minimum of two laser beams, thus enabling the normal n and the distance d to be derived by Newton's method or the like if the reprojection error is minimized.

Also, because the opposite direction of the normal (camera optical axis) of the image capturing surface of the image capturing apparatus 20 is [0, 0, −1] when the normal and the distance d are derived, the estimation unit 32 is able to derive the angle θ from the inverse cosine function (arccos).

The image conversion unit 33, upon the image data of the image shot for vibration measurement being output from the image capturing apparatus 20, acquires this image data. The image conversion unit 33 then converts the image of the acquired image data into an image that would be obtained were the normal n of the measurement target surface coincident with the normal of the image capturing surface of an image capturing apparatus, using the estimated angle θ. Furthermore, the image conversion unit 33, in the example embodiment, also adjusts the size of the converted image, also using the estimated distance d. Also, since the image capturing apparatus 20 outputs image data continuously in chronological order, the image conversion unit 33 also executes image conversion continuously in chronological order.

Specifically, the image conversion unit 33, first, calculates a mapping transformation matrix H using the estimated angle θ and the normal n, and then converts the image shot for vibration measurement, using the calculated mapping transformation matrix H. Also, calculation of the mapping transformation matrix H is performed using the following equations 5 and 6, for example. Furthermore, H or H' described on page 100 of the following reference document can be utilized as the mapping transformation matrix H.

Reference document: Gang Xu, "3D CG from Photographs" (in Japanese), Kindai Kagaku Sha, 2001

Also, in the following equation 5, X is the coordinate at an arbitrary point A on the measurement target surface in the coordinate system of the image capturing apparatus 20. X' is the coordinate of the point A in the coordinate system of an image capturing apparatus (hereinafter, "virtual image capturing apparatus") that is assumed to have shot the converted image. Also, R is a rotation matrix between the image capturing apparatus 20 and the virtual image capturing apparatus, and t is a translation vector. d' is the distance between the virtual image capturing apparatus and the measurement target surface, and d'=dcosθ. Note that the virtual image capturing apparatus is shown with dashed lines in FIG. 4.

$$X = RX' + t \quad \text{[Equation 5]}$$

$$H = R + t n^T / d' \quad \text{[Equation 6]}$$

The vibration measurement unit 34, first, calculates the displacement of the measurement target surface in a surface direction from the image (hereinafter, "converted image") converted by the image conversion unit 33. Next, the vibration measurement unit 34 calculates the displacement of the measurement target surface in the normal direction from the converted image and the displacement in the surface direction. Thereafter, the vibration measurement unit 34 calculates the vibration of the structure 40 from the displacement in the surface direction and the displacement in the normal direction. Here, processing by the vibration measurement unit 34 will be specifically described below, with X' and Y' respectively being the horizontal direction and the vertical direction of the converted image, and Z' being the normal direction of the converted image.

Specifically, the vibration measurement unit 34 takes the converted image at an arbitrary time as a reference image, and takes the converted image at other times as a processing image. The vibration measurement unit 34 then, for every processing image, finds a specified region (hereinafter, "specific region") that includes a region of interest on the reference image, that is, a measurement target region within the image, and calculates a displacement (d1x', d1y') in the surface direction.

Also, the vibration measurement unit 34 creates an image group (hereinafter, "reference image group") by enlarging and reducing the reference image by scale factors determined in advance, in order to calculate a displacement d1z' of the specific region in the normal direction. At this time, the vibration measurement unit 34 sets a center position of the enlarged and reduced images of the reference image, based on the displacement (d1x', d1y') in the surface direction previously calculated, and creates the reference image group.

Next, the vibration measurement unit 34, for every processing image, collates the processing image to the enlarged and reduced images, and specifies the enlarged or reduced image that is most highly collated. Specification of a highly collated image can be performed using a similarity correlation function such as SAD (Sum of Absolute Difference), SSD (Sum of Squared Difference), NCC (Normalized Cross-Correlation) or ZNCC (Zero-mean Normalized Cross-Correlation), for example. The vibration measurement unit 34 then specifies the image with the highest similarity, that is, a highly correlated image, from among the images constituting the reference image group, and calculates the enlargement factor or reduction factor (hereinafter, "scale factor") of the specified image as an amount (d1z') indicating the displacement of the specific region in the normal direction.

Also, in the subsequent description, the displacement that is ultimately obtained with a certain processing image is represented by a displacement (dnx', dny') and a scale factor (dnz') which is an amount indicating the displacement in the normal direction. The result of similarly calculating displacement for the time-series images can be treated as a value that changes over time, and is thus denoted as a displacement (dnx'(t), dny'(t)) and a scale factor (dnz'(t)).

Furthermore, the vibration measurement unit 34 calculates the vibration of the measurement target region on the structure 40 in the surface direction, based on the displacement of the specific region in the surface direction and shooting information of the image capturing apparatus 20. Next, the vibration measurement unit 34 calculates the vibration of the measurement target surface in the normal direction, based on the displacement of the specific region in the normal direction and the distance d' from the image capturing apparatus 20 to the structure 40.

Specifically, the displacement (dnx'(t), dny'(t)) of the specific region in the surface direction is calculated in pixel units. Accordingly, the vibration measurement unit 34, as shown in the following equations 7 and 8, calculates a movement amount ($\Delta x'$, $\Delta y'$) [mm] respectively in the X-direction and Y-direction, using the length per pixel (Dx, Dy) [mm/pixel] of the image sensor of the image capturing apparatus 20 respectively in the X'-direction and Y'-direction. Also, the length per pixel (Dx, Dy) [mm/pixel] of the image sensor can be calculated from the following equations 9 and 10, using a pixel pitch (px, py) [mm] of the image sensor, a focal length f [mm] of the lens, and a distance L [mm] from a principal point of the lens to the measurement target region. Note that L=d'(=dcos$\theta$).

$$\Delta x' = D_x \cdot dnx(t) \quad \text{[Equation 7]}$$

$$\Delta y' = D_x \cdot dny(t) \quad \text{[Equation 8]}$$

$$Dx = px \cdot (L/f) \quad \text{[Equation 9]}$$

$$Dy = py \cdot (L/f) \quad \text{[Equation 10]}$$

Also, the displacement of the specific region in the normal direction is calculated as a scale factor. Accordingly, the vibration measurement unit 34 calculates a movement amount $\Delta z'$ [mm] in the Z' direction (normal direction), using the distance L [mm] from the principal point of the image sensor to the specific region, as shown in the following equation 11.

$$\Delta z' = L \cdot dnz'(t) \quad \text{[Equation 11]}$$

Also, the movement amount ($\Delta x'$, $\Delta y'$, $\Delta'$) of the measurement target surface obtained in this way is obtained for every frame of the time-series images that are shot. Therefore, each movement amount obtained for every time-series image represents the measurement target surface whose sampling interval is the reciprocal of the shooting framerate. Each movement amount obtained for every time-series image calculated by the vibration measurement unit 34 can thus be treated as vibration information (vibration waveform) of the measurement target region for each of the X'-direction, Y'-direction and Z'-direction.

[Apparatus operations]

Next, operations of the vibration measurement system 100 in the example embodiment will be described using FIGS. 5 and 6. In the following description, FIGS. 1 to 4 will be taken into consideration as appropriate. Also, in the example embodiment, the vibration measurement method is implemented by operating the vibration measurement system 100. Therefore, the following description of the operations of the vibration measurement system 100 will be given in place of a description of the vibration measurement method in the example embodiment.

First, angle and distance estimation processing by the vibration measurement apparatus 30 will be described using FIG. 5. FIG. 5 is a flow diagram showing operations at the time of the angle and distance estimation processing by the vibration measurement apparatus in the example embodiment of the invention.

Figure 5:
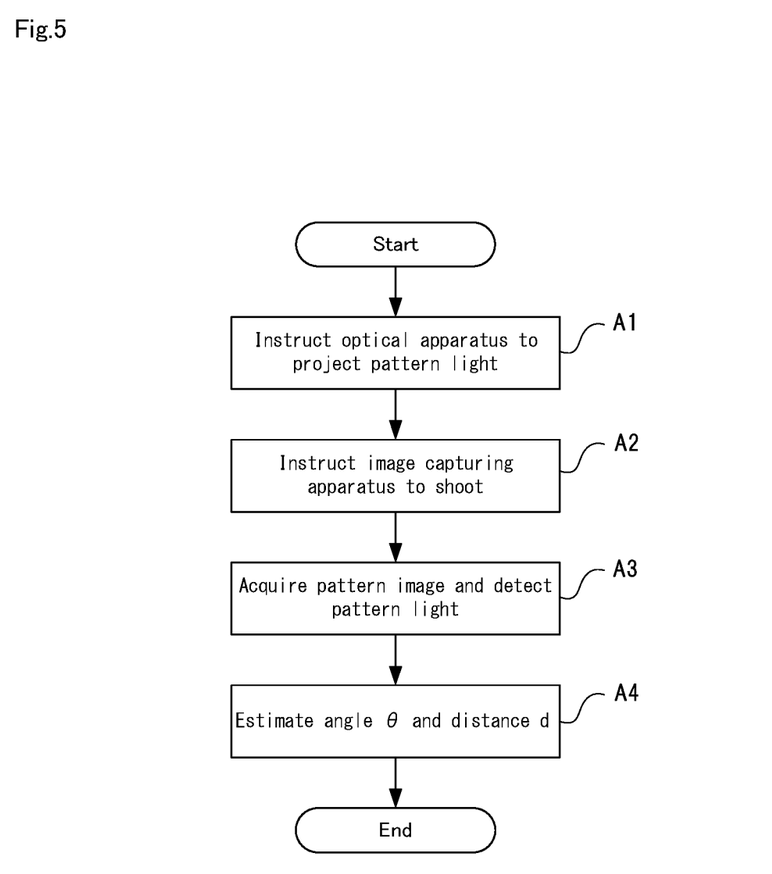
FIG. 5 is a flow diagram showing operations at the time of angle and distance estimation processing by the vibration measurement apparatus in the example embodiment of the invention.

As shown in FIG. 5, initially, the vibration measurement apparatus 30 instructs the optical apparatus 10 to irradiate pattern light (step A1). Pattern light is thereby projected onto the measurement target surface of the structure 40.

Next, the vibration measurement apparatus 30 instructs the image capturing apparatus 20 to perform shooting (step A2). The image capturing apparatus 20 thereby shoots the measurement target surface onto which the pattern light is projected, and outputs the image (pattern image) obtained by the shooting to the vibration measurement apparatus 30.

Next, the detection unit 31 acquires the pattern image from the image capturing apparatus 20, and detects the pattern light from the acquired pattern image (step A3). Specifically, in step A3, the detection unit 31 detects the focused spots 22 from the pattern image 21, and specifies the position coordinates (X, Y) of each focused spot 22 that is detected.

Next, the estimation unit 32 estimates the angle $\theta$ between the normal of the image capturing surface of the image capturing apparatus 20 and the measurement target surface, based on the pattern light detected in step A3, and, furthermore, also estimates the distance d from the image capturing surface of the image capturing apparatus 20 to the measurement target surface (step A4). Also, the estimation unit 32 stores the estimated angle $\theta$ and distance d in the data storage unit 35. The angle and distance estimation processing ends with execution of step A4.

Next, vibration measurement processing by the vibration measurement apparatus 30 will be described using FIG. 6. FIG. 6 is a flow diagram showing operations at the time of vibration measurement processing by the vibration measurement apparatus in the example embodiment of the invention.

Figure 6:
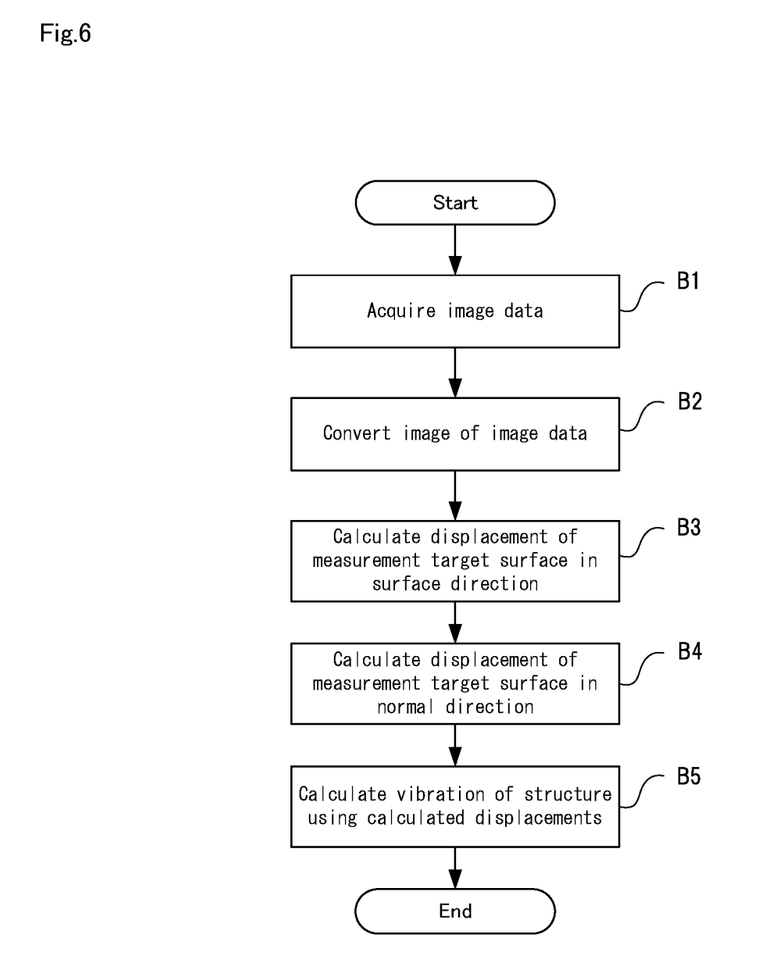
FIG. 6 is a flow diagram showing operations at the time of vibration measurement processing by the vibration measurement apparatus in the example embodiment of the invention.

As shown in FIG. 6, initially, in the vibration measurement apparatus 30, the image conversion unit 33 acquires the image data of the measurement target surface that is output by the image capturing apparatus 20 (step B1).

Next, the image conversion unit 33 converts the image of the image data acquired in step B1 into an image that would be obtained were the normal of the measurement target surface coincident with the normal of the image capturing surface of the image capturing apparatus 20, using the angle and distance estimated in step A4 shown in FIG. 5 (step B2).

Specifically, the image conversion unit 33, after execution of step A4 shown in FIG. 5, calculates the mapping transformation matrix H using the estimated angle and distance, before executing step B2. In step B2, the image conversion unit 33 then executes image conversion, using the mapping transformation matrix H.

Also, steps B1 and B2 are executed during a preset time period or until conversion of a preset number of image data has ended.

Next, the vibration measurement unit 34 calculates the displacement of the measurement target surface in the surface direction from the image (converted image) converted in step B2 (step B3).

Next, the vibration measurement unit 34 calculates the displacement of the measurement target surface in the normal direction from the converted image and the displacement in the surface direction calculated in step B3 (step B4).

Thereafter, the vibration measurement unit 34 calculates the vibration of the structure 40 from the displacement in the surface direction calculated in step B3 and the displacement in the normal direction calculated in step B4 (step B5).

Effects of the Example Embodiment

As described above, in the example embodiment, the angle between the image capturing surface of the image capturing apparatus 20 and the measurement target surface and the distance from the image capturing surface to the measurement target surface are estimated, and the shot image is automatically converted, based on the estimated data. According to the example embodiment, highly accurate vibration measurement can be executed without requiring manual operations, even in the case where the image capturing apparatus 20 is not arranged directly facing the measurement target surface.

Example Variations

Next, example variations in the example embodiment will be described. In the abovementioned example, the estimated distance d is also used to adjust the size of the converted image, but, in this example variation, a mode can be adopted in which size adjustment is not performed.

In this example variation, the image conversion unit 33 converts the image of the acquired image data into an image that would be obtained were the normal n of the measurement target surface coincident with the normal of the image capturing surface of the image capturing apparatus, using only the estimated angle θ.

Specifically, in this example variation, the image conversion unit 33 creates an equation that converts the coordinate system of the image capturing apparatus 20 into the coordinate system of a virtual image capturing apparatus, based on the estimated angle θ and the direction in which the normal (camera optical axis) of the image capturing surface of the image capturing apparatus 20 inclines. The image conversion unit 33 then performs image conversion, using the created equation.

Also, in this example variation, the vibration measurement unit 34 corrects the vibration of the structure 40 using the estimated distance d and angle θ, when measuring vibration. Specifically, the ratio of the distance d' (=dcosθ) from the image capturing surface of the virtual image capturing apparatus to the measurement target surface and the distance d from the image capturing surface of the image capturing apparatus 20 to the measurement target surface is derived, and the reference image and processing images are respectively reduced, based on the derived ratio. Thereafter, the vibration measurement unit 34 calculates the displacement in the surface direction and the normal direction, and, furthermore, also calculates vibration, using the reduced reference image and processing images.

[Program]

A program in the example embodiment need only be a program that causes a computer to execute steps A1 to A4 shown in FIG. 5 and steps B1 to B5 shown in FIG. 6. The vibration measurement apparatus 30 in the example embodiment can be realized by this program being installed on a computer and executed. In this case, a processor of the computer performs processing while functioning as the detection unit 31, the estimation unit 32, the image conversion unit 33, and the vibration measurement unit 34.

Also, a program in the example embodiment may be executed by a computer system built from a plurality of computers. In this case, for example, the computers may each function as one of the detection unit 31, the estimation unit 32, the image conversion unit 33, and the vibration measurement unit 34.

Figure 7:
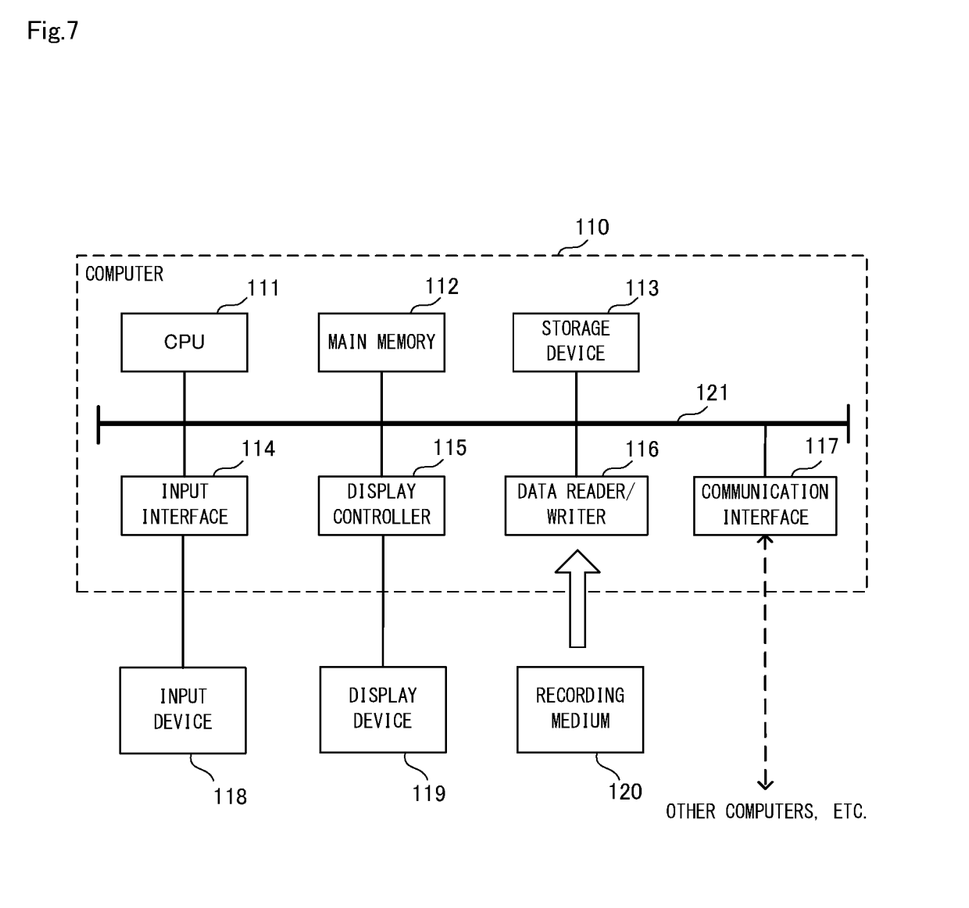
FIG. 7 is a block diagram showing an example of a computer that realizes the vibration measurement apparatus in the example embodiment of the invention.

Here, a computer that realizes the vibration measurement apparatus 30 by executing the program of the example embodiment will be described using FIG. 7. FIG. 7 is a block diagram showing an example of a computer that realizes the vibration measurement apparatus in the example embodiment of the invention.

As shown in FIG. 7, a computer 110 includes a CPU (Central Processing Unit) 111, a main memory 112, a storage device 113, an input interface 114, a display controller 115, a data reader/writer 116, and a communication interface 117. These constituent elements are connected to each other in a manner that enables data communication, via a bus 121. Note that the computer 110 may include a GPU (Graphics Processing Unit) or an FPGA (Field-Programmable Gate Array), in addition to the CPU 111 or instead of the CPU 111.

The CPU 111 implements various computational operations, by extracting a program (codes) of the example embodiment that are stored in the storage device 113 to the main memory 112, and executing these codes in predetermined order. The main memory 112, typically, is a volatile storage device such as a DRAM (Dynamic Random Access Memory). Also, programs in the example embodiment are provided in a state of being stored in a computer-readable recording medium 120. Note that programs in the example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display on the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the vibration measurement apparatus 30 in the example embodiment is also realizable by using hardware corresponding to the respective constituent elements, rather than by a computer on which programs are installed. Furthermore, the vibration measurement apparatus 30 may be realized in part by programs, and the remaining portion may be realized by hardware.

The example embodiment described above can be partially or wholly realized by supplementary notes 1 to 16 described below, although the invention is not limited to the following description.

(Supplementary Note 1)

A system for measuring vibration of a structure, including:

an optical apparatus that projects pattern light onto a measurement target surface of the structure;

an image capturing apparatus that shoots the measurement target surface; and a vibration measurement apparatus, the vibration measurement apparatus including:

a detection unit that acquires, as a pattern image from the image capturing apparatus, an image of the measurement target surface onto which the pattern light is projected, and detects the projected pattern light from the pattern image;

an estimation unit that estimates an angle between a normal of an image capturing surface of the image capturing apparatus and a normal of the measurement target surface, based on the detected pattern light;

an image conversion unit that converts the image obtained due to shooting by the image capturing apparatus into an image that would be obtained were the normal of the measurement target surface coincident with the normal of the image capturing surface of the image capturing apparatus, using the estimated angle; and a vibration measurement unit that measures vibration of the structure, using the converted image.

(Supplementary Note 2)

The vibration measurement system according to supplementary note 1, in which the estimation unit further estimates a distance from the image capturing surface of the image capturing apparatus to the measurement target surface, based on the detected pattern light, and the vibration measurement unit, when measuring the vibration, corrects vibration of the structure in a normal direction of the measurement target surface, using the estimated distance.

(Supplementary Note 3)

The vibration measurement system according to supplementary note 1, in which the estimation unit further estimates a distance from the image capturing surface of the image capturing apparatus to the measurement target surface, based on the detected pattern light, and the image conversion unit corrects a size of the converted image, using the estimated distance and angle.

(Supplementary Note 4)

The vibration measurement system according to supplementary note 2 or 3, in which the optical apparatus is a laser irradiation apparatus, and projects a focused spot of a plurality of laser beams onto the measurement target surface as the pattern light, and the estimation unit sets, for every focused spot, an equation indicating a relationship between position coordinates of the focused spot, center position coordinates of the laser beams and the normal of the measurement target surface, and estimates the distance and the angle, using the equations respectively set for the focused spots.

(Supplementary Note 5)

An apparatus for measuring vibration of a structure, including:

a detection unit that acquires, as a pattern image from an image capturing apparatus that shoots a measurement target surface of the structure, an image of the measurement target surface onto which pattern light is projected by an optical apparatus, and detects the projected pattern light from the pattern image;

an estimation unit that estimates an angle between a normal of an image capturing surface of the image capturing apparatus and a normal of the measurement target surface, based on the detected pattern light;

an image conversion unit that converts the image obtained due to shooting by the image capturing apparatus into an image that would be obtained were the normal of the measurement target surface coincident with the normal of the image capturing surface of the image capturing apparatus, using the estimated angle; and a vibration measurement unit that measures vibration of the structure, using the converted image.

(Supplementary Note 6)

The vibration measurement apparatus according to supplementary note 5, in which the estimation unit further estimates a distance from the image capturing surface of the image capturing apparatus to the measurement target surface, based on the detected pattern light, and the vibration measurement unit, when measuring the vibration, corrects vibration of the structure in a normal direction of the measurement target surface, using the estimated distance.

(Supplementary Note 7)

The vibration measurement apparatus according to supplementary note 5, in which the estimation unit further estimates a distance from the image capturing surface of the image capturing apparatus to the measurement target surface, based on the detected pattern light, and the image conversion unit corrects a size of the converted image, using the estimated distance and angle.

(Supplementary Note 8)

The vibration measurement apparatus according to supplementary note 6 or 7, in which, in a case where the optical apparatus is a laser irradiation apparatus, and projects a focused spot of a plurality of laser beams onto the measurement target surface as the pattern light, the estimation unit sets, for every focused spot, an equation indicating a relationship between position coordinates of the focused spot, center position coordinates of the laser beams and the normal of the measurement target surface, and estimates the distance and the angle, using the equations respectively set for the focused spots.

(Supplementary Note 9)

A method for measuring vibration of a structure, including:

(a) a step of projecting pattern light onto a measurement target surface of the structure with an optical apparatus;

(b) a step of shooting the measurement target surface with an image capturing apparatus;

(c) a step of acquiring, as a pattern image from the image capturing apparatus, an image of the measurement target surface onto which the pattern light is projected, and detecting the projected pattern light from the pattern image;

(d) a step of estimating an angle between a normal of an image capturing surface of the image capturing apparatus and a normal of the measurement target surface, based on the detected pattern light;

(e) a step of converting the image obtained due to shooting by the image capturing apparatus into an image that would be obtained were the normal of the measurement target surface coincident with the normal of the image capturing surface of the image capturing apparatus, using the estimated angle; and (f) a step of measuring vibration of the structure, using the converted image.

(Supplementary Note 10)

The vibration measurement method according to supplementary note 9, in which, in the (d) step, a distance from the image capturing surface of the image capturing apparatus to the measurement target surface is further estimated, based on the detected pattern light, and in the (f) step, when measuring the vibration, vibration of the structure in a normal direction of the measurement target surface is corrected, using the estimated distance.

(Supplementary Note 11)

The vibration measurement method according to supplementary note 9, in which, in the (d) step, a distance from the image capturing surface of the image capturing apparatus to the measurement target surface is further estimated, based on the detected pattern light, and in the (e) step, a size of the converted image is corrected, using the estimated distance and angle.

(Supplementary Note 12)

The vibration measurement method according to supplementary note 10 or 11, in which, in a case where the optical apparatus is a laser irradiation apparatus, and projects a focused spot of a plurality of laser beams onto the measurement target surface as the pattern light, in the (d) step, for every focused spot, an equation indicating a relationship between position coordinates of the focused spot, center position coordinates of the laser beams and the normal of the measurement target surface is set, and the distance and the angle are estimated, using the equations respectively set for the focused spots.

(Supplementary Note 13)

A computer-readable recording medium having recorded thereon a program for measuring vibration of a structure with a computer, the program including instructions that cause the computer to carry out:

(a) a step of acquiring, as a pattern image from an image capturing apparatus that shoots a measurement target surface of the structure, an image of the measurement target surface onto which pattern light is projected by an optical apparatus, and detecting the projected pattern light from the pattern image;

(b) a step of estimating an angle between a normal of an image capturing surface of the image capturing apparatus and a normal of the measurement target surface, based on the detected pattern light;

(c) a step of converting the image obtained due to shooting by the image capturing apparatus into an image that would be obtained were the normal of the measurement target surface coincident with the normal of the image capturing surface of the image capturing apparatus, using the estimated angle; and (d) a step of measuring vibration of the structure, using the converted image.

(Supplementary Note 14)

The computer-readable recording medium according to supplementary note 13, in which, in the (d) step, a distance from the image capturing surface of the image capturing apparatus to the measurement target surface is further estimated, based on the detected pattern light, and in the (f) step, when measuring the vibration, vibration of the structure in a normal direction of the measurement target surface is corrected, using the estimated distance.

(Supplementary Note 15)

The computer-readable recording medium according to supplementary note 13, in which, in the (d) step, a distance from the image capturing surface of the image capturing apparatus to the measurement target surface is further estimated, based on the detected pattern light, and in the (e) step, a size of the converted image is corrected, using the estimated distance and angle.

(Supplementary Note 16)

The computer-readable recording medium according to supplementary note 14 or 15, in which, in a case where the optical apparatus is a laser irradiation apparatus, and projects a focused spot of a plurality of laser beams onto the measurement target surface as the pattern light, in the (d) step, for every focused spot, an equation indicating a relationship between position coordinates of the focused spot, center position coordinates of the laser beams and the normal of the measurement target surface is set, and the distance and the angle are estimated, using the equations respectively set for the focused spots.

Although the invention of the present application has been described above with reference to an example embodiment, the invention is not limited to the foregoing example embodiment. Various modifications apparent to those skilled in the art can be made to the configurations and details of the invention of the present application within the scope of the invention.

INDUSTRIAL APPLICABILITY

As described above, according to the invention, highly accurate vibration measurement can be executed without requiring manual operations. The invention is useful in measuring the vibration of structures such as infrastructure elements.

LIST OF REFERENCE SIGNS

10 Optical apparatus
20 Image capturing apparatus
30 Vibration measurement apparatus
31 Detection unit
32 Estimation unit
33 Image conversion unit
34 Vibration measurement unit
40 Structure
100 Vibration measurement system
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A system for measuring vibration of a structure, comprising:

an optical apparatus for projecting pattern light onto a measurement target surface of the structure;

an image capturing apparatus for shooting the measurement target surface; and a vibration measurement apparatus, the vibration measurement apparatus including:

a detection unit that is configured to acquire, as a pattern image from the image capturing apparatus, an image of the measurement target surface onto which the pattern light is projected, and detecting the projected pattern light from the pattern image;

an estimation unit that is configured to estimate an angle between a normal of an image capturing surface of the image capturing apparatus and a normal of the measurement target surface, based on the detected pattern light;

an image conversion unit that is configured to convert the image obtained due to shooting by the image capturing apparatus into an image that would be obtained were the normal of the measurement target surface coincident with the normal of the image capturing surface of the image capturing apparatus, using the estimated angle; and a vibration measurement unit that is configured to measure vibration of the structure, using the converted image.

2. The vibration measurement system according to claim 1, wherein the estimation unit further estimates a distance from the image capturing surface of the image capturing apparatus to the measurement target surface, based on the detected pattern light, and the vibration measurement unit, when measuring the vibration, corrects vibration of the structure in a normal direction of the measurement target surface, using the estimated distance.

3. The vibration measurement system according to claim 2, wherein the optical apparatus is a laser irradiation apparatus, and projects a focused spot of a plurality of laser beams onto the measurement target surface as the pattern light, and the estimation unit sets, for every focused spot, an equation indicating a relationship between position coordinates of the focused spot, center position coordinates of the laser beams and the normal of the measurement target surface, and estimates the distance and the angle, using the equations respectively set for the focused spots.

4. The vibration measurement system according to claim 1, wherein the estimation unit further estimates a distance from the image capturing surface of the image capturing apparatus to the measurement target surface, based on the detected pattern light, and the image conversion unit corrects a size of the converted image, using the estimated distance and angle.

5. A method for measuring vibration of a structure, comprising:

projecting pattern light onto a measurement target surface of the structure with an optical apparatus;

shooting the measurement target surface with an image capturing apparatus;

acquiring, as a pattern image from the image capturing apparatus, an image of the measurement target surface onto which the pattern light is projected, and detecting the projected pattern light from the pattern image;

estimating an angle between a normal of an image capturing surface of the image capturing apparatus and a normal of the measurement target surface, based on the detected pattern light;

converting the image obtained due to shooting by the image capturing apparatus into an image that would be obtained were the normal of the measurement target surface coincident with the normal of the image capturing surface of the image capturing apparatus, using the estimated angle; and measuring vibration of the structure, using the converted image.

6. The vibration measurement method according to claim 5, wherein, in the estimating, a distance from the image capturing surface of the image capturing apparatus to the measurement target surface is further estimated, based on the detected pattern light, and in the measuring, when measuring the vibration, vibration of the structure in a normal direction of the measurement target surface is corrected, using the estimated distance.

7. The vibration measurement method according to claim 6, wherein, in a case where the optical apparatus is a laser irradiation apparatus, and projects a focused spot of a plurality of laser beams onto the measurement target surface as the pattern light, in the estimating, for every focused spot, an equation indicating a relationship between position coordinates of the focused spot, center position coordinates of the laser beams and the normal of the measurement target surface is set, and the distance and the angle are estimated, using the equations respectively set for the focused spots.

8. The vibration measurement method according to claim 5, wherein, in the estimating, a distance from the image capturing surface of the image capturing apparatus to the measurement target surface is further estimated, based on the detected pattern light, and in the converting, a size of the converted image is corrected, using the estimated distance and angle.

9. A non-transitory computer-readable recording medium that includes a program recorded thereon for measuring vibration of a structure with a computer, the program including instructions that cause the computer to carry out:

acquiring, as a pattern image from an image capturing apparatus for shooting a measurement target surface of the structure, an image of the measurement target surface onto which pattern light is projected by an optical apparatus, and detecting the projected pattern light from the pattern image;

estimating an angle between a normal of an image capturing surface of the image capturing apparatus and a normal of the measurement target surface, based on the detected pattern light;

converting the image obtained due to shooting by the image capturing apparatus into an image that would be obtained were the normal of the measurement target surface coincident with the normal of the image capturing surface of the image capturing apparatus, using the estimated angle; and measuring vibration of the structure, using the converted image.

10. The non-transitory computer-readable recording medium according to claim 9, wherein, in the estimating, a distance from the image capturing surface of the image capturing apparatus to the measurement target surface is further estimated, based on the detected pattern light, and in the measuring, when measuring the vibration, vibration of the structure in a normal direction of the measurement target surface is corrected, using the estimated distance.

11. The non-transitory computer-readable recording medium according to claim 10,
wherein, in a case where the optical apparatus is a laser irradiation apparatus, and projects a focused spot of a plurality of laser beams onto the measurement target surface as the pattern light,
in the estimating, for every focused spot, an equation indicating a relationship between position coordinates of the focused spot, center position coordinates of the laser beams and the normal of the measurement target surface is set, and the distance and the angle are estimated, using the equations respectively set for the focused spots.

12. The non-transitory computer-readable recording medium according to claim 9,
wherein, in the estimating, a distance from the image capturing surface of the image capturing apparatus to the measurement target surface is further estimated, based on the detected pattern light, and
in the converting, a size of the converted image is corrected, using the estimated distance and angle.

* * * * *